Nov. 8, 1949 J. S. BAKER 2,487,410
FLEXIBLE JOINT

Filed April 10, 1946 2 Sheets-Sheet 1

Inventor:
John S. Baker
By Thiess, Olson+Mecklenburger
Attys

Nov. 8, 1949     J. S. BAKER     2,487,410
FLEXIBLE JOINT

Filed April 10, 1946     2 Sheets-Sheet 2

Inventor:
John S Baker.
By Thiess, Olsen & Mecklenburger
Attys

Patented Nov. 8, 1949

2,487,410

UNITED STATES PATENT OFFICE 2,487,410

FLEXIBLE JOINT

John S. Baker, Chicago, Ill., assignor to Cook Electric Company, Chicago, Ill., a corporation of Illinois Application April 10, 1946, Serial No. 660,960

3 Claims. (Cl. 285—90)

1

This invention relates to expansion joints of the bellows type for pipe lines which are used for various purposes.

In such pipe lines, the two ends of the installed pipes which are to be connected by the expansion joint are frequently not in direct axial alignment but are apt to vary slightly one way or another therefrom. The bellows joint which is to unite such pipe ends is provided with end plates or flanges corresponding in size to flanges on the ends of the pipe and are adapted to be bolted directly thereto so that the bellows may form a directly thereto so that the bellows may form a continuous passage between and through the pipes. If, however, the ends of the pipe are slightly out of line, the bolting of the end flanges or plates of the bellows to the flanges of the pipes tends to warp and distort the bellows and places its parts under more or less of a stress or strain, which in the long run, in the repeated expansions and contractions of the bellows under the conditions of pressure and temperature to which it may be subjected by the material in the line, may cause leakages to develop at the joints or elsewhere or other failure of the bellows to take place and a reduction in its normal useful life to result.

An object of this invention is to provide a bellows expansion joint which may be connected in a pipe line without warping or distortion of its parts and therefore free from abnormal stresses tending to shorten its normal life regardless of the minor disalignment of the pipe ends such as is frequently encountered in pipe-line installations.

A further object is the provision of a bellows expansion joint with laterally or transversely adjustable end plates or flanges whereby the bellows may be connected in its natural and normal position between the offset or out-of-line ends of the pipe line.

Further objects and advantages will appear from the detailed description and claims to follow, in connection with the accompanying drawing which illustrates, by way of example and not of limitation, an embodiment of the invention, and in which—

Fig. 1 is a perspective view of the expansion joint connected to the ends of the pipe of the pipe line, a part of the bellows flanges being broken away to show the eccentric connection of the same with the joint flanges of the bellows unit;

2

Figure 3:
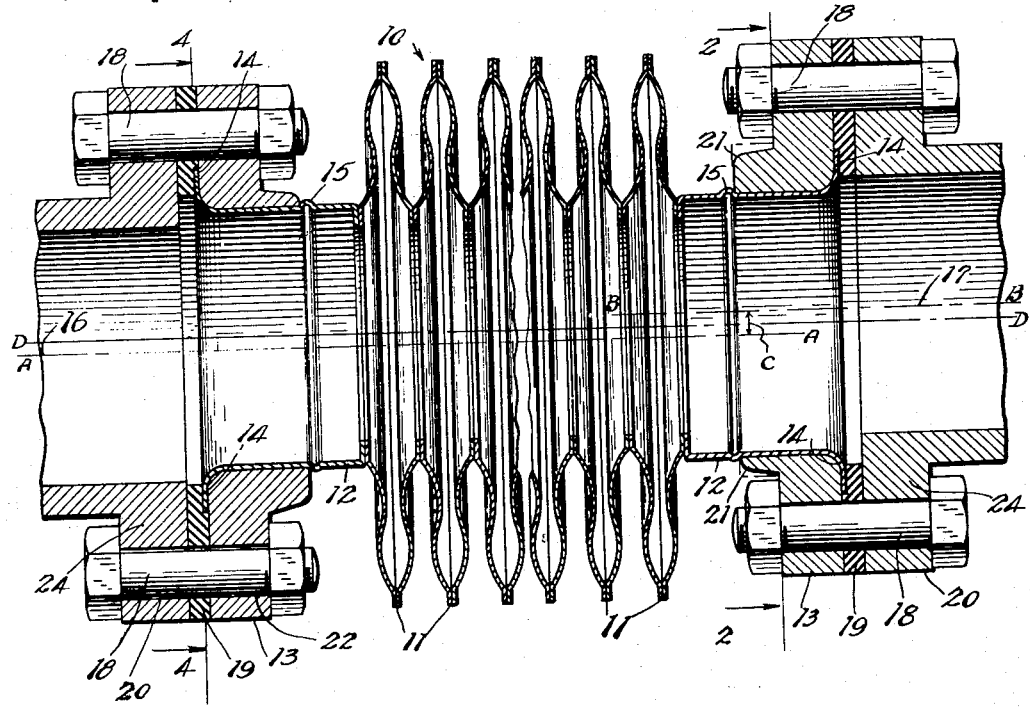
Fig. 3 is a longitudinal sectional plan view on the line 3—3 of Fig. 4.

Referring to these views, the bellows 10 may be of known construction and comprise so-called flanges 11, as many as desired, as indicated by the broken lines thereacross in Fig. 3, and consisting of metal rings or plates of suitable material properly joined together alternately at their inner and outer peripheries, as by welding, brazing or otherwise, there being end fittings 12 suitably connected to end flanges 11 of the bellows, as by welding, brazing, or otherwise.

End fittings 12 of the bellows are arranged to carry joint ring flanges 13 which are of heavy material and which may be of cast iron, being capable of rotation on sleeves 12 to adjust them rotatively to a desired position thereon. They are held in place longitudinally on fittings 12, or the fittings 12 are held in place in ring flanges 13, by outwardly turned end flanges 14 and spun beads 15 on fittings 12.

The outer diameter of the joint ring flanges 13 of the bellows unit may be the same as end fittings on pipe sections represented as 16 and 17. Said pipe section end fittings are designated broadly as 24 and are provided with bolt holes 20 equal in number to bolt holes 22 in ring flanges 13 at each end of bellows 10. These parts may be bolted securely together, as by bolts 18, a suitable gasket 19 being interposed between the said flanges. The ring flanges 13 of the bellows unit are rotatable on the fittings 12, and, by a slight turning, the bolt holes 22 therein may be brought into alignment with those in the pipe fittings 24.

Figure 1:
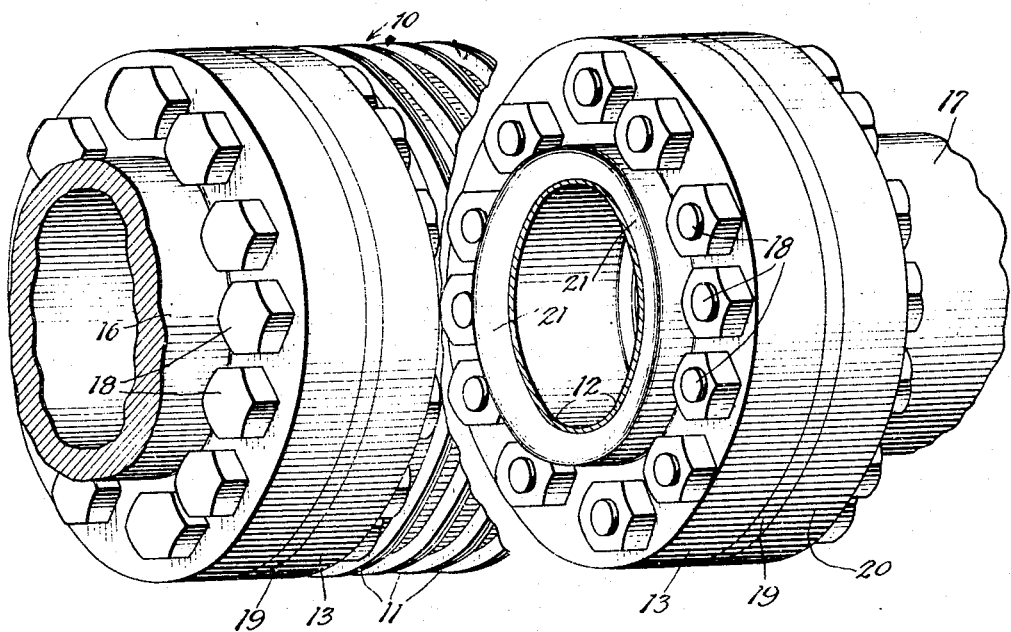
Figure 2:
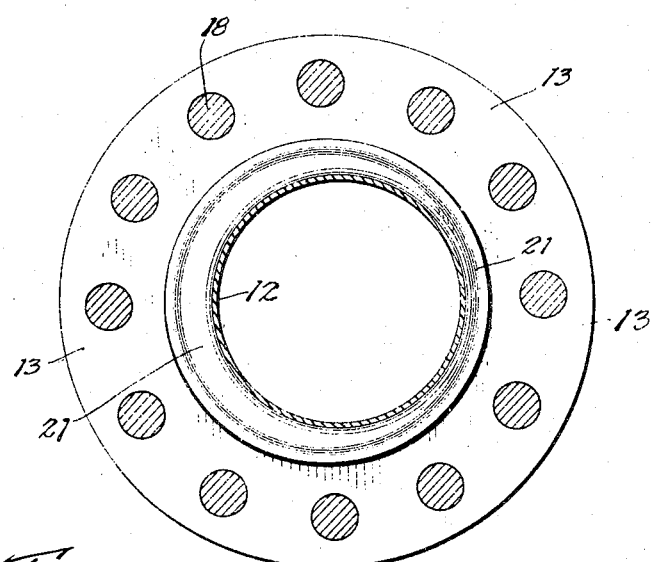
Fig. 2 is a cross-sectional view taken on the line 2—2 of Fig. 3.

As before stated, the ends of the pipe line are apt to be slightly out of axial alignment, so that a bellows expansion unit connected therebetween may be warped and distorted more or less and prematurely give way. In order to overcome this difficulty and to provide an expansion joint of this type of universial application, in which the bellows may be connected naturally, without warping or distortion, between the pipe ends whether the latter are out of axial line or not, the central apertures of the bellows ring flanges 13, through which the fittings 12 pass, are provided eccentric or off-center with respect to either the outer circumferences thereof or the circle of bolts 18. This is shown in Figs. 1 and 2, where the section of the sleeve 12 is shown closer to the rim 21 of the ring flange 13 at the right of the horizontal diameter than at the left. It is also shown in Fig. 3, where at the left the sleeve 12 is shown nearer the bolt at the top side of the figure than at the lower side, and at the right of said figure the same is shown nearer the bolt at the lower and further at the upper side.

Figure 4:
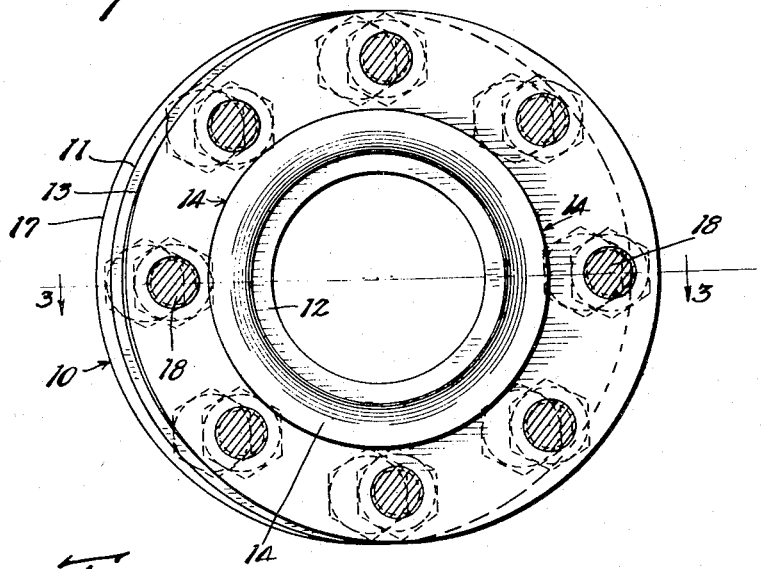
Fig. 4 is a cross section taken on the line 4—4 of Fig. 3.

This eccentricity is further indicated in Fig. 4, where the center rim on the end of pipe 17 is seen at the left extending beyond the circle of the outer peripheries of the bellows flanges 11 and beyond the outer periphery of the bellows end ring flange 13. The latter, of course, is the same as the outer periphery of the end of pipe 16. The position of the nuts of the tightening bolts shown in dotted lines in this Fig. 4 also shows the offset positions at the two ends of the bellows unit when so connected with the ends of the pipe, as indicated in Fig. 3.

To illustrate the manner of applying the invention to an installation having adjacent pipe sections failing to align axially, I have indicated the axis of end fitting 24 of pipe section 16 as A—A in Fig. 3 and the axis of end fitting 24 of pipe section 17 as line B—B. The extent of the misalignment is the distance C between lines A—A and B—B. The center of bellows 10 is indicated by line D—D. By arranging each ring flange 13 in eccentric relation to its bellows end fitting 12, the distance C may be readily compensated for without placing any strain upon the bellows. It will be observed that this structure provides a simple means to care for such misalignment in a quick and efficient way and does not require a special treatment for each variation of distance C, although in certain instances it may vary only slightly and in other instances it may vary considerably. If distance C is too great for a given structure, large ring flange 13 may be used so that the amount of the eccentricity of bellows fittings 12 with respect to these ring flanges 13 may be greater.

The number of tightening bolts 18 may be as desired. Figs. 3 and 4 show eight and Figs. 1 and 2 show twelve. They conform to those provided for in the pipe flanges, and these, as explained above, may vary.

It will be observed, therefore, that by turning one or both ring flange members 13 on the ends 12 of the bellows unit, before the bolts 18 are inserted and tightened, the bellows can be set normally and naturally without warping or distortion or strain between the two ends of the pipe, whatever their alignment may be and whatever direction their misalignment may take. When, therefore, after such adjustment the bolts 18 are inserted and tightened, the bellows flanges act normally in expanding and contracting and are not handicapped by stresses and strains set up by warped or distorted positions. This is simply and easily accomplished, the life of the bellows is prolonged and hard-to-find leaks in and objectionable shutdowns of pipe lines are avoided.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. An expansion joint comprising a bellows unit formed of a plurality of diaphragms arranged for expansion and contraction along a common axis, end fittings fixedly attached to said bellows unit, a joint ring flange eccentrically mounted on each end fitting, said mountings each including an outwardly turned flange at the end of the fitting and an annular bead spaced from said outwardly turned flange, the space between said outwardly turned flange and said bead receiving the joint ring flange in rotatable but non-axially movable relation, there being provisions for bolting said joint ring flange at each end with a pipe connection not in axial alignment with said common axis of said bellows diaphragms, the rotatable movement of said joint ring flanges providing for pipe connection alignment with said joint ring flanges without imposing torsional stresses upon said bellows flanges.

2. An annular joint comprising a bellows unit formed of a plurality of diaphragms arranged for expansion and contraction along a common axis, end fittings fixedly attached to said bellows unit, a joint ring flange eccentrically mounted on each end fitting, said mounting each including an outwardly turned flange at the end of the fitting and a stop spaced from said outwardly turned flanges, the space between said outwardly turned flange and said stop receiving the joint ring flange in rotatable but non-axially movable relation, there being provision for attaching said joint ring flange at each end with a pipe connection not in axial alignment with said common axis of said bellows diaphragms, the rotatable movement of said joint ring flanges providing for pipe connection alignment with said joint ring flanges without imposing torsional stresses upon said bellows flanges.

3. An annular joint comprising a bellows unit formed of a plurality of diaphragms arranged for expansion and contraction along a common axis, an end fitting fixedly attached to said bellows unit, a joint ring flange eccentrically mounted on said end fitting, said mounting including an outwardly turned flange and a stop spaced from said outwardly turned flange, the space between said outwardly turned flange and said stop receiving said joint ring flange in rotatable but non-axially movable relation, there being provision for attaching said joint ring flange with a pipe connection not in axial alignment with said common axis of said bellows diaphragms, the rotatable movement of said joint ring flange providing for pipe connection alignment with said pipe ring flange without imposing torsional stresses upon said bellows flanges.

JOHN S. BAKER.

REFERENCES CITED

The following references are of record in the file of this patent:

UNITED STATES PATENTS

| Number | Name | Date |
| --- | --- | --- |
| 1,304,979 | Hirshstein | May 27, 1919 |
| 1,726,483 | Giesler | Aug. 27, 1929 |